United States Patent

[11] 3,583,656

[72] Inventor Arthur I. Protas
Cupertino, Calif.
[21] Appl. No. 853,890
[22] Filed Aug. 28, 1969
[45] Patented June 8, 1971
[73] Assignee Cartridge Television, Inc.
New York, N.Y.

[54] CARTRIDGE CARRIAGE FOR TAPE TRANSPORT
12 Claims, 3 Drawing Figs.

[52] U.S. Cl. .......... 242/199
[51] Int. Cl. .......... G03b 1/04, G11b 15/32, G11b 23/04
[50] Field of Search .......... 242/197, 200, 201, 210, 55.19; 352/72, 78

[56] References Cited

UNITED STATES PATENTS

| | | | |
|---|---|---|---|
| 2,969,929 | 1/1961 | Rudzitis | 242/199 |
| 3,146,316 | 8/1964 | Knoth | 242/210X |
| 3,189,289 | 6/1965 | Maxey | 242/210X |
| 3,273,815 | 9/1966 | Schuller | 242/201 |
| 3,395,871 | 8/1968 | Ackermann et al. | 242/198 |
| 3,429,519 | 2/1969 | Staar | 242/200 |

*Primary Examiner*—Leonard D. Christian
*Attorney*—Townsend and Townsend

ABSTRACT: A carriage for a tape cartridge of the type having a pair of rotatable hubs on which a flexible magnetic tape is wound. The carriage has a frame provided with side channel members for removably receiving the cartridge and a pair of ball-like mounting members on a crossmember for insertion in the ends of the bores of the hubs for rotation therewith as the mounting members make essentially point contact relationship with spring-biased holding means on the crossmember. The carriage is formed to permit the tape to move out of the cartridge through an open side thereof and about a portion of the arcuate path of travel of rotating transducer means.

INVENTOR.
ARTHUR I. PROTAS
BY Townsend and Townsend
ATTORNEYS

INVENTOR
ARTHUR I. PROTAS

Townsend and Townsend
ATTORNEYS

CARTRIDGE CARRIAGE FOR TAPE TRANSPORT

This invention relates to improvements in tape transports and, more particularly, to a carriage for releasably positioning a tape cartridge adjacent to rotating transducer means.

The present invention is directed to carriage or mounting structure for a tape cartridge of the type having a pair of rotatable hubs on which is mounted a flexible, magnetic tape which moves between the hubs as the same rotate in the cartridge. The hubs are provided with central bore therethrough for receiving hub drive shafts forming part of a tape transport of which the carriage of this invention is to be mounted.

The carriage includes a frame having a pair of side members which form channels or tracks for receiving the cartridge as it is moved into the carriage. Means on the carriage for releasably holding the carriage includes a pair of ball-like mounting members which are removably received within the ends of bores of respective hubs, each mounting member being held in a corresponding hub bore by resilient means on the frame which makes essentially point contact with the mounting member. In this way, the mounting members can rotate with the hubs relative to the carriage, yet there will be minimum resistance to rotation of the mounting members due to the point contact relationship with the resilient holding means. In this way, the hubs are releasably held in the carriage to permit the latter to move the cartridge into an operative position automatically when the sequence of operation of the tape transport system commences.

The construction of the cartridge is such that the cartridge can be of the type having an open side through which a central stretch of the tape can pass as the tape stretch is shifted out of the cartridge. Moreover, the carriage is configured such that it can be automatically driven in opposite directions so as to permit the hubs to move onto hub drive shafts in an automatic fashion to eliminate having to position the hubs manually.

The primary object of this invention is to provide a carriage for a tape cartridge of the type having a pair of rotatable hubs wherein the carriage has mounting members adapted to be releasably coupled to the hubs in a manner to permit rotation of the latter while maintaining frictional forces to a minimum when the carriage positions the cartridge in an operative position.

Another object of this invention is to provide a carriage of the type described, wherein the carriage is provided with a frame having a crossmember for rotatably carrying a pair of ball-like mounting members held in place on the crossmember by resilient means making essentially point contact with the mounting members so that, when the mounting members are removably received with the ends of respective hub bores of a tape cartridge, the mounting members can rotate with the hubs with minimum resistance while at the same time, the cartridge is releasably coupled to the carriage.

A further object of this invention is to provide a carriage of the type described wherein the crossmember interconnects a pair of spaced side members having tracks for receiving the side margins of the tape cartridge to allow it to readily move into the carriage yet allow the carriage to move the cartridge into an operative position where a central stretch of the tape can move out of the cartridge and adjacent to and along the arcuate path of travel of rotatable transducer means. Other objects of this invention will become apparent as the following specification progresses, reference being had to the accompanying drawings for an illustration of an embodiment of the invention.

Figure 1:
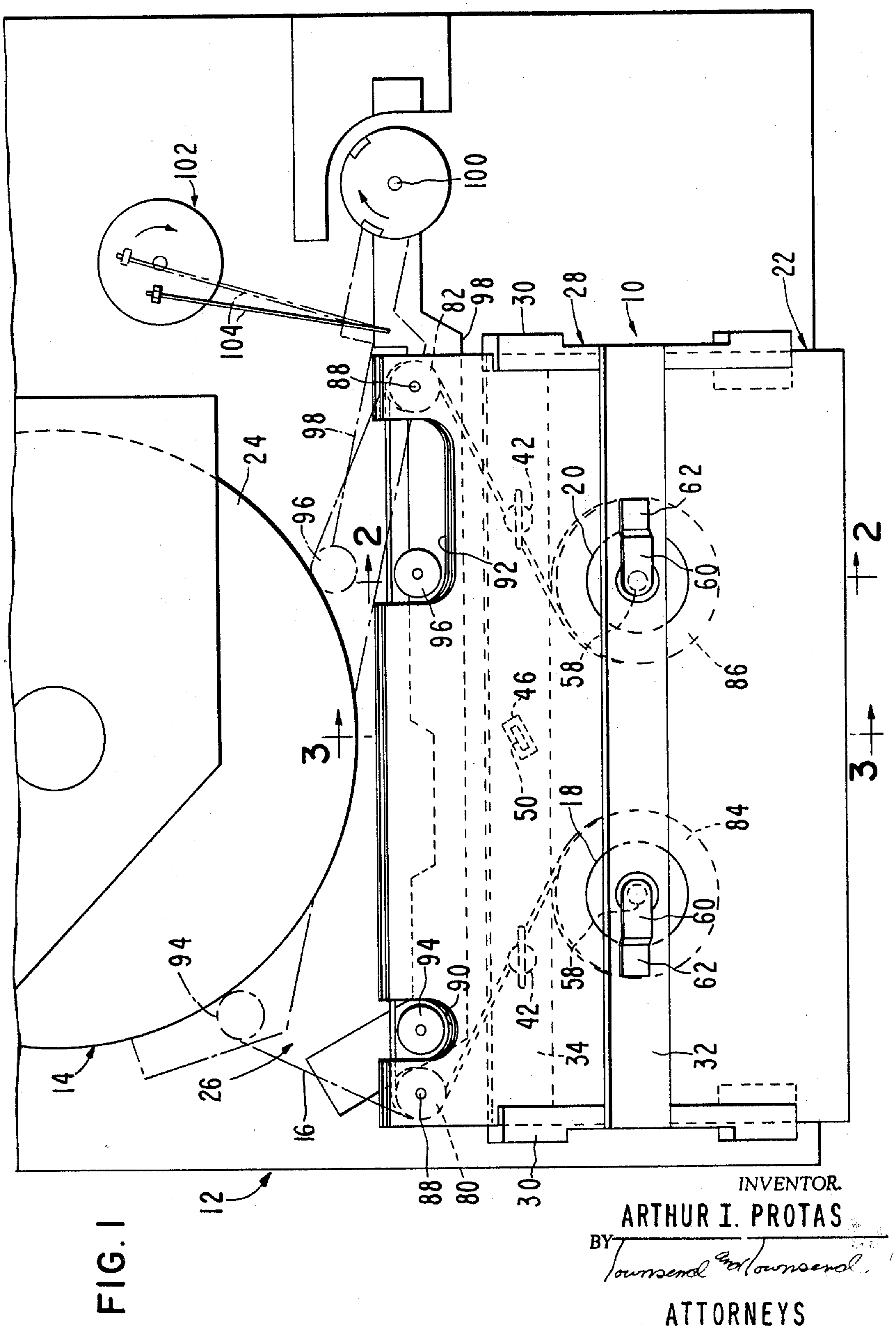
FIG. 1 is a fragmentary, top plan view of a tape transport system utilizing the cartridge carriage of this invention with a tape cartridge mounted therein.

The carriage of this invention is broadly denoted by the numeral 10 and, for purposes of illustration, it will be described as forming a part of a tape transport system 12 of the type having transducer means 14 rotatable about a central axis. The carriage is adapted to releasably hold a tape cartridge 22 so that the transducer means can move in scanning relationship to an elongated, flexible, movable magnetic tape 16 carried by hubs 18 and 20 of the tape cartridge. Transducer means 14, for purposes of illustration, includes a rotatable drum 24 having a number of circumferentially spaced transducers or heads (not shown) on its outer periphery. The heads are coupled with suitable electronic circuitry (not shown) also forming a part of transport system 12, whereby electronic signals can be recorded on tape 16 as the heads scan the tape. Also, the heads can sense electronic signals previously recorded on the tape if the tape transport is in a playback mode.

Figure 2:
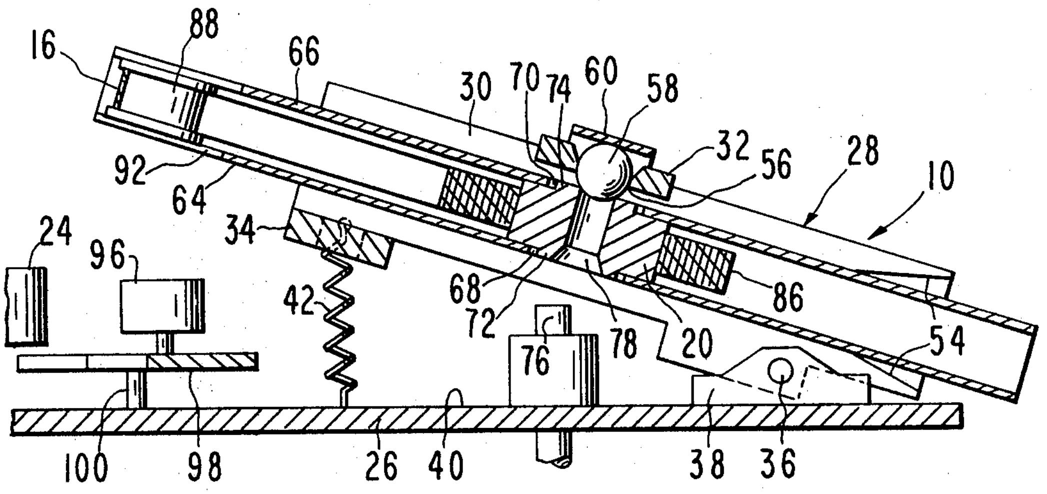
FIG. 2 is a cross-sectional view taken along line 2–2 of FIG. 1, showing the carriage in an inclined, cartridge-receiving position.
Figure 3:
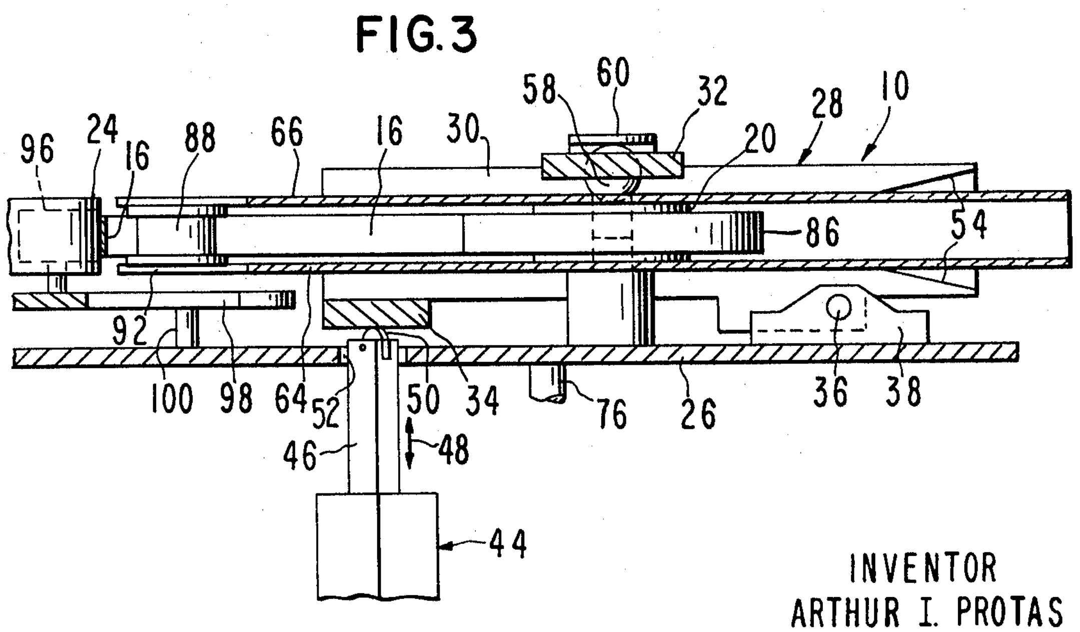
FIG. 3 is a cross-sectional view taken along line 3–3 of FIG. 1 and illustrating the position of the carriage as it orients a tape cartridge for recording or playback purposes.

Carriage 10 is mounted adjacent to drum 24 on a baseplate 26 for movement from an inclined, cartridge-receiving position as shown in FIG. 2 to a generally horizontal, operative position as shown in FIG. 3. In the operative position of the carriage, tape cartridge 22 is positioned in a manner such that a central stretch of tape 16 can be moved laterally of and outwardly from the cartridge into partial surrounding relationship to drum 24. In this way, the heads carried by the drum can scan the tape to record signals thereon during a record mode or can sense signals on the tape during a playback mode.

Carriage 10 includes a frame 28 formed from a pair of side channel members 30 and a pair of crossmembers 32 and 34 which are staggered relative to each other, member 32 being on the upper part of the frame and member 34 being on the lower part (FIGS. 2 and 3). Each side member 30 is transversly C-shaped, as shown in FIG. 1, so as to form a track for shiftably receiving the corresponding side margin of cartridge 22. Also, one end of each side member 30 is pivotally coupled by a pin 36 to a pivot mount 38 secured to the upper surface 40 of baseplate 26 in any suitable manner. The axes of pins 36 are aligned with each other so that carriage 10 can pivot from the inclined position of FIG. 2 to the horizontal position of FIG. 3 and return. A pair of spaced coil springs 42 (FIG. 2) bias carriage 10 in a counterclockwise sense when viewing FIG. 2. One end of each spring is coupled in any suitable manner to crossmember 34 and the other end of the spring is coupled in any suitable manner to base plate 26.

Power means 44 (FIG. 3) forming a part of tape transport 12 is used to pivot carriage 10 through a limited arc in a clockwise sense when viewing FIG. 3. Means 44 can be of any suitable construction, but for purposes of illustration, it includes a vertically shiftable extension 46 which is driven in one direction in any suitable manner, such as by a solenoid action. Extension 46 has a roller 50 rotatably mounted at its upper end for engaging the underside of crossmember 34, there being an opening 52 in baseplate 26 to permit extension 46 to reciprocate.

Upon actuation of power means 44, extension 46 is shifted upwardly to in turn pivot carriage 10 about pins 36 against the bias forces of springs 42. When extension 46 moves in the opposite direction upon deactuation of power means 44, the spring bias forces causes carriage 10 to move in a counterclockwise sense when viewing FIG. 2.

Each side member 30 is provided with diverging end surfaces 54 (FIGS. 2 and 3) at the end of its channel adjacent to pins 36. Surfaces 54 facilitate the insertion of cartridge 22 in carriage 10 since the cartridge is fed from right to left in the carriage when viewing FIG. 2 and when the carriage is in the inclined position of FIG. 2. Thus, surfaces 54 guide the cartridge into place notwithstanding the inclination of the carriage itself.

Crossmember 32 has a pair of countersunk holes 56 therethrough (FIG. 2) for providing seats for a pair of ball-like mounting members 58 adapted to be received in the ends of the bores of respective hubs 18 and 20 in the manner shown in FIG. 2. Each mounting member 58 is formed from a suitable, wear-resistant material such as Teflon or the like, and is held in the corresponding hole 56 by a resilient strip 60, such as a strip of spring steel or the like. Each strip 60 has an end portion 62 which is secured in any suitable manner to crossmember 32. Strips 60 bias mounting member 58 into seated position within respective holes 56 and are in substantially point contact relationship with respective mounting member 58 when the latter are seated within the ends of the bores of hubs 18 and 20, respectively. Thus, members 58 can rotate with the hubs and relative to strips 60; however, the point contact relationship between the strips and members 58 minimizes friction and provides a suitable mount for centering the hubs for movement into coupled relationship with hub drive shafts to be described.

Cartridge 22 is of the type having a pair of spaced walls 64 and 66 provided with aligned central openings 68 and 70, respectively, for receiving end portions 72 and 74 of each of the hubs 18 and 20. Portions 72 and 74 are loosely received within openings 68 and 70, respectively, so that each hub can be shifted slightly if necessary to move into position onto a respective hub drive shaft 76, the drive shafts for the hubs forming parts of transport system 12 and adapted to rotate the corresponding hubs with respect to walls 64 and 66. Each hub drive shaft 76 has a radially disposed pin (not shown) receivable within a groove (not shown) in the corresponding end face of the hub so as to provide a driving connection between the shaft and the hub. The shaft is receivable within the central bore of the corresponding hub as shown in FIG. 3 and the bore is countersunk in the end that receives the shaft to provide a tapered inner surface 78 to facilitate the movement of the hub onto the corresponding shaft as carriage 10 is moved from the inclined position of FIG. 2 to the operative position of FIG. 3.

Cartridge 22 further has a pair of tape guides 80 and 82 about which tape 16 is normally positioned. The side of the cartridge extending between guides 80 and 82 is open as shown in FIG. 2 to permit the tape to move laterally of and outwardly from the cartridge and about a portion of the outer periphery of drum 24. As shown in FIG. 1, the tape extends tangentially away from a tape pack 84 on hub 18, about guide 80, along the open side margin of the cartridge to guide 82, about the latter guide, and then tangentially onto a tape pack 86 carried by hub 20. The cartridge has a pair of opposed end walls which maintain walls 64 and 66 in spaced apart relationship, guides 80 and 82 being carried by pins 88 between walls 64 and 66.

Wall 64 has a pair of recesses 90 and 92 extending inwardly from the open side of the cartridge for receiving tape guides 94 and 96, respectively. For purposes of illustration, wall 66 also has recesses 90 and 92, although the recesses need only be in wall 64. Guides 94 and 96 carried by a swingable are 98 mounted on a pin 100 for rotation about an axis substantially perpendicular to baseplate 26. An eccentric drive 102 has a rod 104 connected to arm 98 for reciprocating the same along an arcuate path whereby the arm moves from the full line position of FIG. 1 to the dashed line position thereof and returns.

In the full line position of the arm, guides 94 and 96 are aligned with recesses 90 and 92, when carriage 10 is in the inclined position of FIG. 2. Thus, when the carriage moves to the operative position of FIG. 3, the cartridge receives guides 94 and 96. Thus, the guides are in position to move the tape laterally of and outwardly from the cartridge through the open side thereof when arm 98 swings from the full line position to the dashed line position. In the dashed line position, the guides are positioned adjacent to the outer periphery of drum 24 at circumferentially spaced locations with respect thereto. In this way, the tape is partially wrapped about the outer periphery of the drum so that the heads carried by the drum can move in scanning relationship to the tape as the drum rotates. A suitable capstan drive (not shown) also forms a part of tape transport system 12 for moving the tape in a predetermined direction relative to the drum as the latter rotates.

Suitable control means (not shown) also forming a part of tape transport system 12 is provided to actuate eccentric drive 102 as well as to effect raising and lowering of extension 46, rotation of drum 24, and selective rotation of hub drive shafts 76, one shaft 76 adapted to be driven by its drive motor (not shown) during a record or playback mode and the other shaft 76 adapted to be driven by its drive motor during a tape rewind mode. All of the various functions actuated by the control means occur in a predetermined sequence to permit recording, playback, tape rewind or cartridge insertion or removal.

In operation, carriage 10 is normally in the inclined position of FIG. 2 by virtue of extension 46 being at its uppermost position. In this position, the carriage will be ready to receive tape cartridge 22 although it will be biased downwardly by the bias force of springs 42.

The operator directs the tape cartridge, open side first, toward and into the tracks of side members 30. Surfaces 54 facilitate the insertion of the side margin of the cartridge in the tracks of members 30. The cartridge is then forced completely into the cartridge until elements 58 are moved into seated relationship with the ends of the bores of respective hubs 18 and 20. When this occurs, the elements engage the circular edges defining the ends of the bores while strips 60 remain in substantially point contact relationship with elements 58 at locations substantially diametrically opposite to the portion of the elements which are received within respective hub bores. The elements not only center the hubs in openings 68 and 70 of wall 64 and 66 of the cartridge, but also releasably hold the cartridge in a relatively fixed position with the track of side channel members 30. The cartridge is then ready to be shifted from the inclined position to the horizontal position of FIG. 3.

By operating the control means, power means 44 is actuated to cause extension 46 to descend whereupon springs 42 operate to urge carriage 10 and thereby cartridge 22 into the operative position of FIG. 3. At this time, guides 94 and 96 are received within respective recesses 90 and 92 in wall 64 so that the guides will be in position to move the tape out of the cartridge upon swinging movement of arm 98.

As cartridge 22 rotates in a counterclockwise sense when viewing FIG. 2, hubs 18 and 20 move onto respective shafts 76 until the shafts are received within the central bores of the hubs. This action is facilitated by tapered end surfaces 78 of the hub bores. The driving connection between shaft 76 and respective hubs 18 and 20 is made by pins which are radially disposed relative to respective shafts 76 and are received within radial grooves in the adjacent faces of respective hubs.

The control means is further actuated to cause arm 98 to move in a clockwise sense when viewing FIG. 1, whereby guides 94 and 96 move into the dashed line positions of FIg. 1 and position a central stretch of the tape in partially wrapped relationship to the outer periphery of drum 24. The drum will have been set in rotation prior to this operation and as soon as the tape is so positioned, the tape is caused to move in a predetermined direction by the capstan drive means provided therefor, whereupon the heads of the drum will move in scanning relationship to the moving tape. In this way, a record or playback operation can commence and continue until any part or all of the tape has moved past the drum.

For a rewind operation, for instance, the arm can be retracted into the full line position of FIG. 1, whereupon the appropriate hub drive can be actuated to rewind the tape onto the hub from which the tape issued during the record or playback operation.

To remove the cartridge form the carriage, another control can be actuated to cause carriage 10 to be tilted to the inclined position of FIG. 2 to permit removal of the cartridge from the carriage. The cartridge can be grasped at its lowermost side margin and pulled outwardly of the carriage whereupon mounting members 58 will be slightly elevated against the bias forces of strip 60, permitting the hubs to move out of coupled relationship with members 58 so that the carriage will then be free to move downwardly and out of the carriage.

What I claim is:

1. In a tape transport: a carriage for a tape cartridge having a pair of rotatable hubs, said carriage including a frame having means for receiving and mounting the side margins of the cartridge therein, and means releasably engageable with the hubs of the cartridge for holding the latter in a relatively fixed position with respect to the frame.

2. A cartridge carriage for use with a tape transport comprising: a frame having a pair of spaced side members providing tracks for receiving the side margins of a tape cartridge having a pair of rotatable hubs with each hub having a central bore; and means on the frame and insertable in the ends of the hub bores for releasably mounting the hubs on said frame for rotation relative thereto.

3. A carriage as set forth in claim 2, wherein said mounting means includes a ball-like mounting member for each hub respectively, said frame having means in substantially point contact engagement with each mounting member to hold the latter on the frame.

4. A carriage as set forth in claim 2, wherein said frame has a crossmember provided with a pair of spaced openings therethrough, said mounting means including a ball-like mounting member for each opening, respectively, each mounting member being rotatably seated in and extending partially through the corresponding opening, and means on the crossmember in point contact relationship to each mounting member, respectively, for holding the latter in the corresponding opening.

5. A carriage as set forth in claim 4, wherein said holding means includes a resilient strip for each mounting member, respectively, the strips being secured to the crossmember extending across said openings, and engaging respective mounting members.

6. A carriage as set forth in claim 4, wherein each opening is countersunk and has a minimum transverse dimension less than the maximum transverse dimension of the corresponding mounting member.

7. A carriage as set forth in claim 2, wherein said frame includes a second crossmember, the crossmembers being on opposite sides of the frame and staggered relative to each other.

8. In combination: a tape cartridge having a pair of rotatable hubs, each hub provided with a central bore therethrough; and a carriage for mounting the cartridge in an operative position, said carriage including a frame having means defining a pair of spaced, opposed tracks for receiving and mounting the opposed side margins of the cartridge, and a crossmember disposed transversely of said tracks, said crossmember having means receivable within and rotatable with each hub bore, respectively, for mounting the hubs on the frame for rotation relative thereto.

9. A combination as set forth in claim 8, wherein the crossmember has a pair of spaced holes therethrough in alignment with the hub bores when the cartridge is received in the frame, said mounting means including a pair of ball-like mounting members in corresponding holes, the mounting members extending partially through the holes and being rotatable therein, and means in point contact relationship with each mounting member, respectively, for holding the same in the corresponding opening.

10. The combination as set forth in claim 9, wherein said holding means biases the mounting members in a direction toward the cartridge when the latter is received in the frame.

11. The combination as set forth in claim 8, wherein is provided rotatable transducer means for scanning a tape carried by the cartridge, and means for mounting the carriage for movement in a direction to permit the cartridge to move into and out of an operative position with respect to the transducer means.

12. The combination as set forth in claim 8, wherein said frame includes a pair of spaced, generally parallel side channel members, said crossmember interconnecting the side members on one side of the cartridge and a second crossmember interconnecting the side members on the opposite side of the cartridge, the crossmembers being staggered relative to the lengths of the side members.